(12) United States Patent
Kostoff

(10) Patent No.: US 8,134,243 B2
(45) Date of Patent: Mar. 13, 2012

(54) ENERGY CONVERTER

(76) Inventor: Robert Kostoff, Little Britain (CA)

( * ) Notice: Subject to any disclaimer, the term of this patent is extended or adjusted under 35 U.S.C. 154(b) by 722 days.

(21) Appl. No.: 12/230,149

(22) Filed: Aug. 25, 2008

(65) Prior Publication Data
US 2009/0051169 A1 Feb. 26, 2009

(30) Foreign Application Priority Data
Aug. 24, 2007 (CA) .................................. 2598828

(51) Int. Cl.
H02K 7/18 (2006.01)
(52) U.S. Cl. ........................................ 290/1 R; 60/325
(58) Field of Classification Search .................. 290/1 R, 290/1 A; 60/398, 325, 671; H02K 7/00, H02K 7/04, 7/06, 7/18; F03G 3/00; F03B 13/00
See application file for complete search history.

(56) References Cited

U.S. PATENT DOCUMENTS

| | | | |
|---|---|---|---|
| 578,062 A | 3/1897 | Lightner | |
| 990,342 A | 4/1911 | Creese | |
| 1,767,311 A | 6/1930 | Rohrbacher | |
| 2,989,839 A | 6/1961 | Croy | |
| 3,261,160 A | 7/1966 | Hart | |
| 4,019,396 A | 4/1977 | Frechette | |
| 4,179,943 A * | 12/1979 | Gamba | 74/64 |
| 4,333,548 A | 6/1982 | Jones | |
| 4,438,656 A * | 3/1984 | Hayer | 74/63 |
| 4,598,628 A * | 7/1986 | Courtright | 91/481 |
| 4,612,447 A * | 9/1986 | Rowe | 290/1 R |
| 5,146,798 A | 9/1992 | Anderson | |
| 5,221,868 A | 6/1993 | Arman | |
| 5,335,561 A | 8/1994 | Harvey | |
| 5,685,196 A | 11/1997 | Foster | |
| 6,109,123 A | 8/2000 | Baskis et al. | |
| 6,914,339 B2 * | 7/2005 | Rios-Vega | 290/1 R |
| 7,388,298 B2 * | 6/2008 | Blackman | 290/1 A |
| 7,446,440 B2 * | 11/2008 | Mihajlovic | 310/28 |
| 2004/0130227 A1 | 7/2004 | Ricker | |
| 2007/0234723 A1 | 10/2007 | Elliott | |
| 2007/0295559 A1 | 12/2007 | Schliep | |
| 2008/0011552 A1 | 1/2008 | LaPerle | |

FOREIGN PATENT DOCUMENTS

| | | |
|---|---|---|
| GB | 2083954 | 3/1982 |
| JP | 59005888 | 1/1984 |

* cited by examiner

Primary Examiner — Quyen Leung
Assistant Examiner — Thomas Truong

(57) ABSTRACT

A rotor rotates about a spindle and has one or more sliders which are movable between two stop points. An actuator is activated by pressurized fluid and causes the slider or sliders to move back and forth between the stop points. The back and forth movement causes the spindle to rotate and the rotational energy of the spindle is harnessed to produce electricity.

12 Claims, 9 Drawing Sheets

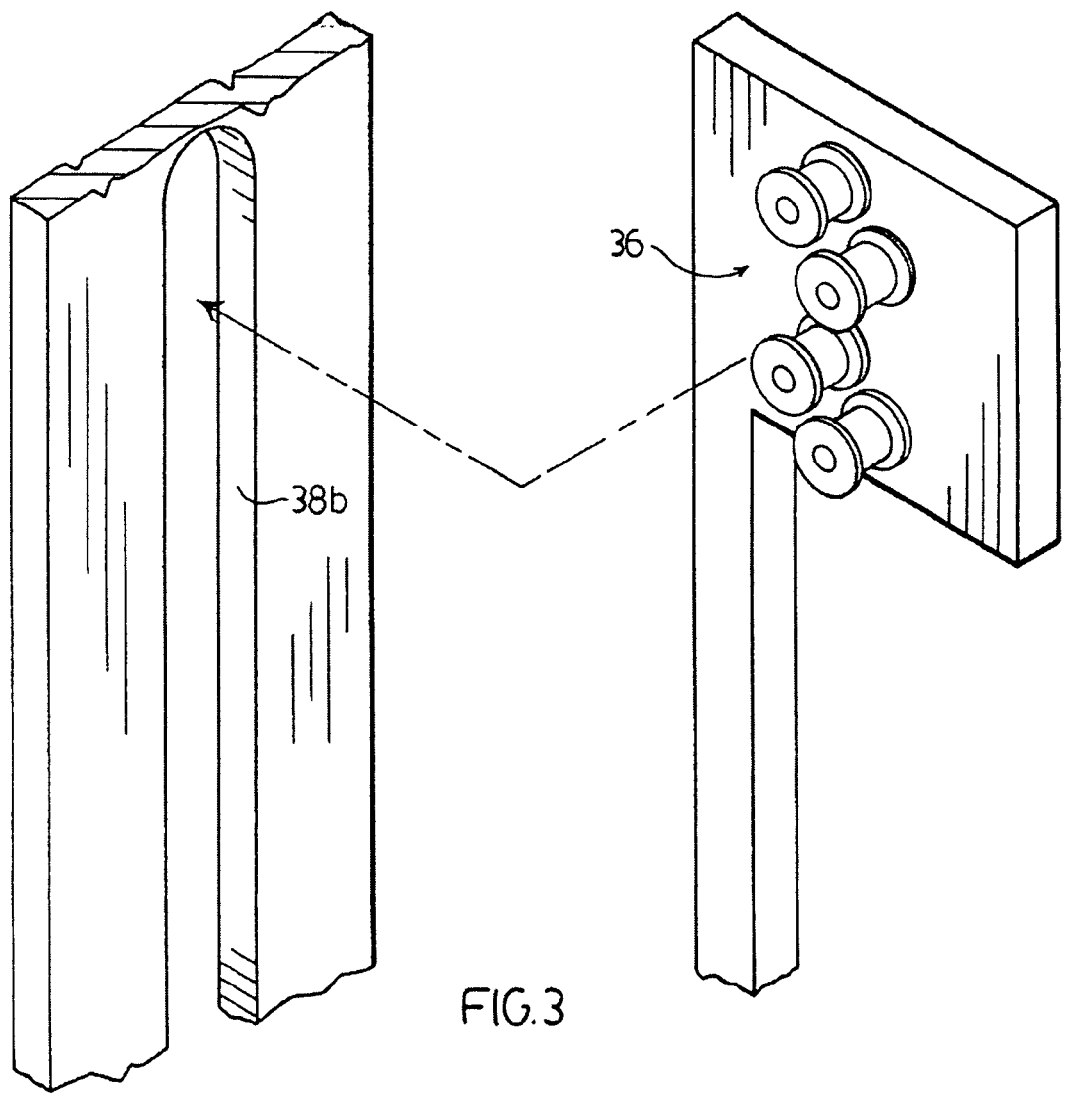
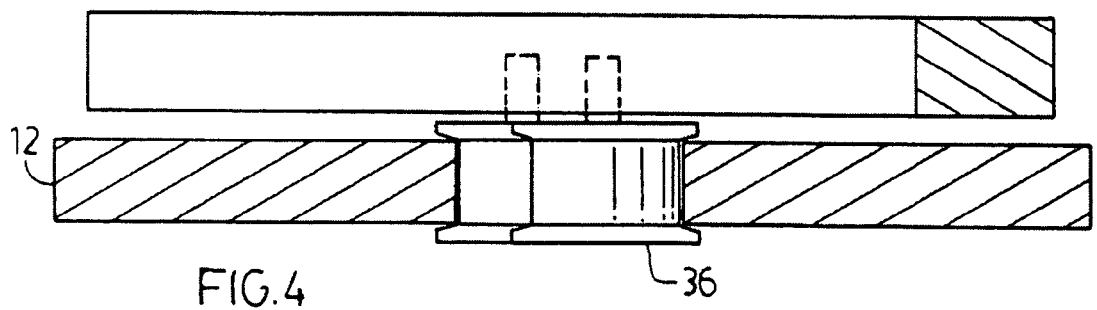

ENERGY CONVERTER

FIELD OF THE INVENTION

This invention relates to an apparatus for converting one form of energy to another and more particularly to an apparatus for converting the energy from fluids under pressure to electrical energy.

BACKGROUND OF THE INVENTION

In mines and at construction sites, pressurized fluid is the usual source of energy for driving heavy machinery such as drills, power shovels and buckets. On farms, pressurized fluid is used in a wide variety of machines. It is used for example to raise and lower heavy machinery such as the cutting heads of combines, ploughs, mowers and the like.

Fluid under pressure is usually produced by compressors powered by gas, diesel fuel or gasoline. In most circumstances it is more economical to compress fluid on a continuous basis rather than periodically when it required. Where the pressurized fluid is produced continuously however, pressure tanks are required to store it until it is required for use. If the pressurized fluid is stored for relatively long periods of time, its pressure will dissipate and it will become unusable during those long periods and the fuel used to pressurize such fluid will be wasted. Accordingly, for the most efficient use of the fuel, the fluid should be used immediately after it is compressed.

I have invented an apparatus for converting the energy of pressurized fluid such as air and water to electrical energy. Unused pressurized fluid need not be stored in pressure tanks for long periods but may be converted to a form of energy which is a much more versatile than pressurized fluid. Since in most workplaces, there is a constant need for electricity, the electricity produced by my apparatus will be used immediately. There will be no need to store it and moreover, when it is used, there will a reduction in the use of electricity from other sources with resulting savings in the cost of electricity.

SUMMARY OF THE INVENTION

Briefly, the apparatus of my invention includes a spindle rotatable about a horizontal axis and a slider adapted to rotate about the axis. The slider is movable between two stop points on opposite sides of the axis. The apparatus also includes an actuator activated by pressurized fluid for causing the slider to move back and forth between the stop points. Also included are means for controlling the back and forth movement such as to cause the slider to rotate. Means is also included for harnessing the rotational energy of the spindle for the production of electricity.

DESCRIPTION OF THE DRAWINGS

The apparatus of the invention is described with reference to the accompanying drawings in which:

FIG. 3 is a perspective view of an array of rollers on the rear face of the slider together with a groove in which the slider moves;

FIG. 4 is a elevation of the slider and groove;

Like reference characters refer to like parts throughout the description of the drawings.

DESCRIPTION OF PREFERRED EMBODIMENTS

Figure 1:
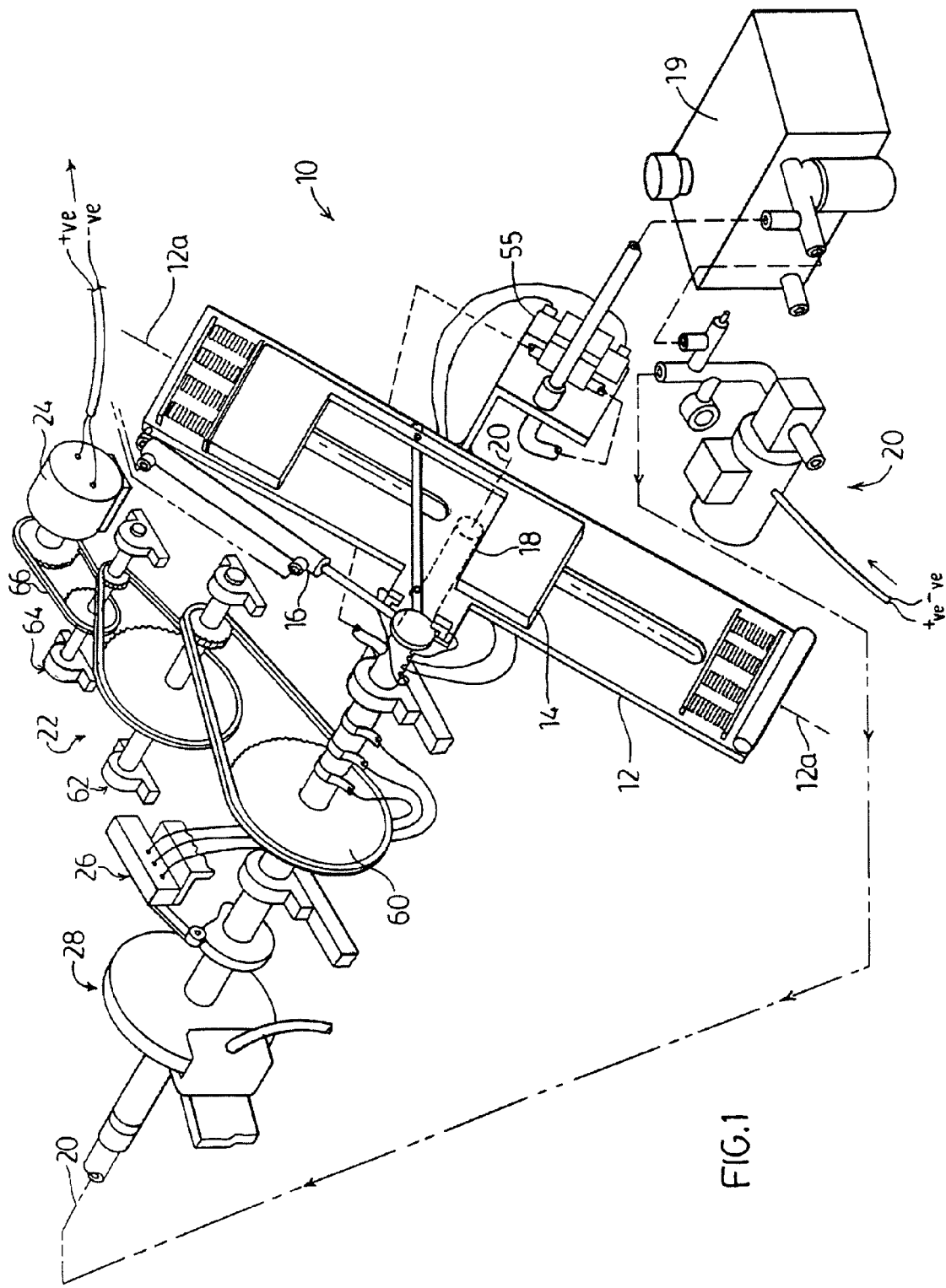
FIG. 1 is a perspective view of the components of the apparatus.

With reference to FIG. 1, the apparatus of the invention, generally 10, includes a rotor 12, a slider 14 and an actuator 16. The rotor is mounted to spindle 18 and revolves about a horizontal axis of rotation 20-20. The rotor has a longitudinal axis 12*a*-12*a* which passes through the axis of rotation.

A fluid such as oil is store in a tank 19 and when required, flows to a motor and pump, generally 20. The pump pressurizes the fluid and causes it to flow through an internal passageway in the spindle. The fluid flows from openings in the spindle to the actuator. The actuator is described below. The fluid may being either in the form of a gas such as air or a liquid such as oil or water.

The spindle is connected to speed accelerating apparatus, generally 22 for increasing the rate of rotation of the input shaft of a turbine generally 24. The apparatus is described below.

The rate of rotation of the spindle is controlled by the combination of a governor, generally 26 and brake generally 28. The governor and brake are conventional and are well known to those familiar with the art.

Figure 2:
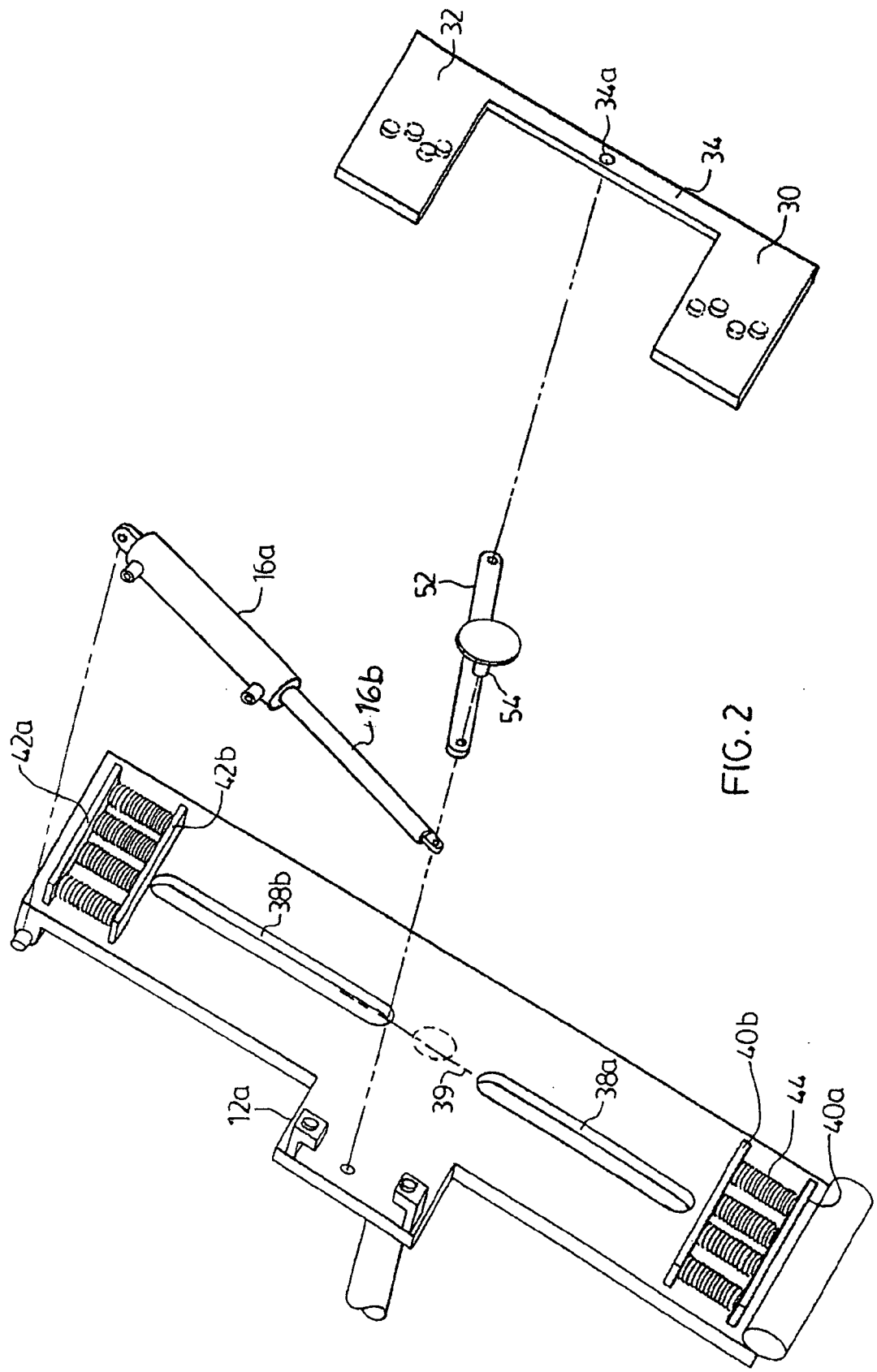
FIG. 2 is an exploded perspective of three components of the apparatus, namely a slider, an actuator and a rotor.

With reference to FIG. 2, the slider is formed of a single sheet of steel or other relatively heavy material and is composed of a pair of terminal plates 30, 32 interconnected by an elongated coupling 34. The two terminal plates are of equal weight and shape and are spaced apart an equal distance from the centre 34*a* of the coupling. The slider is symmetrical about the centre of the coupling.

With reference to FIGS. 1-4, an array of rollers, generally 36 is formed on the under-side of each terminal plate 30,32. The rollers travel in elongated grooves 38*a,b* formed on the outer wall of the rotor. The grooves are aligned with each other and each groove receives a separate array of rollers.

The grooves have aligned longitudinal axes 39 which lie on the longitudinal axis 12*a*-12*a* of the rotor so that the terminal plates travel in a direction parallel to the longitudinal axis.

A pair of spaced outer and inner end plates 40*a*, 40*b*, respectively is formed adjacent to one end of the rotor while outer and inner end plates 42*a*, 42*b*, respectively are formed at the opposite end of the rotor. Each outer end plate is attached to the rotor and is connected to a separate inner end plate by four coil springs 44. The inner end plate is not attached to the rotor but is free to move toward and away from the outer end plate. The springs bias the inner and outer end plates apart.

The slider is free to slide in grooves 38*a,b* whose ends define two stop points of travel. The coil springs cushion the force of impact of the slider on the inner end plates at each stop point. That force can be considerable when the rotor and slider are rotating rapidly.

With reference to FIGS. 1 and 2, the cylinder 16a of actuator 16 is pivotally attached to one end of the rotor. The ram 16b of the actuator is pivotally connected to one end of a rod 52. A pin 54 pivotally connects the centre of the rod to the ear 12a of the rotor. The other end of the rod is pivotally connected to coupling 34 at its centre 34a. The point of connection is on the axis of symmetry of the slider.

The actuator acts to cause the slider to move radially back and forth in grooves 38a,b. When the ram retracts from the position illustrated in FIG. 2, rod 52 rotates clockwise about pin 54 with resulting radial movement of the slider to the left toward inner end plate 40b. When the ram extends, terminal plate 32 slides radially outward and into contact with inner end plate 42b. A conventional control 55 directs the operation of the actuator.

Figure 5:
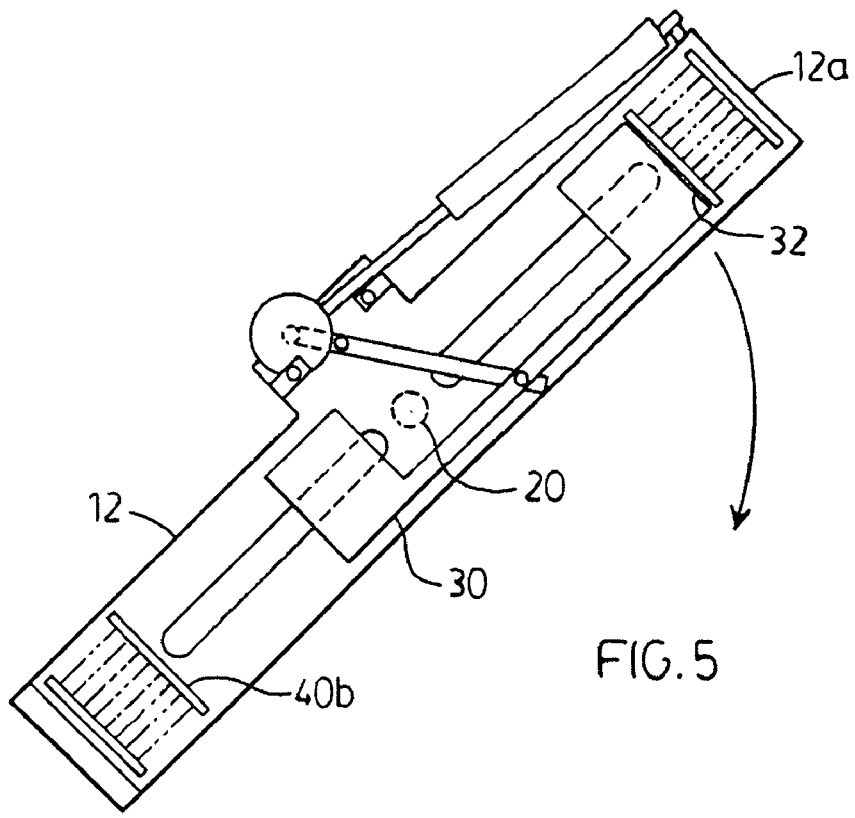
FIGS. 5 to 8 are elevations of the slider and an actuator which controls the movement of the slider. The Figures show the various positions of the slider as it completes one full revolution.

With reference to FIG. 5, as previously indicated, rotor 12 revolves around a horizontal axis of rotation 20-20. The rotor revolves clockwise and its upper end 12a has passed the highest point of its travel during each revolution. The actuator has caused the terminal plate 32 of the slider to contact inner end plate 42b. The other terminal plate 30 is adjacent to the axis of rotation of the rotor and is at its greatest distance from the other stop point defined by inner end plate 40b.

The two terminal plates 30, 32 are of equal weight and they are spaced an equal distance from the axis of symmetry or centre of the slider. The upper plate 32, being farther from the axis of rotation 20-20 of the rotor, exerts a greater moment than the lower plate which is closer to the centre of rotation with resulting acceleration in the rate of clockwise rotation.

The moment or turning effect of terminal plate 32, being farther from the axis of rotation is greater than the moment of terminal plate 30. The preferred location of terminal plate 30 is not as shown in FIG. 5 but rather at the axis of rotation where one half of its weight is on one side of the axis and the other half is on the other side. In that location, its moment will be approximately zero since one half of its weight will cause turning of the rotor in one direction while the other half will cause turning in the opposite direction. As a result, terminal plate 30 will have essentially no turning effect on the rotor while terminal plate 32, by contrast, will be the sole cause of turning disregarding of course the effect of inertia on the movement of the rotor.

The position of terminal plate 30 illustrated in FIG. 5 is less desirable than that just described because it will exert a turning effect opposite to that of terminal plate 32. It will accordingly tend to work against the other terminal plate in causing the rotor to rotate.

Figure 12:
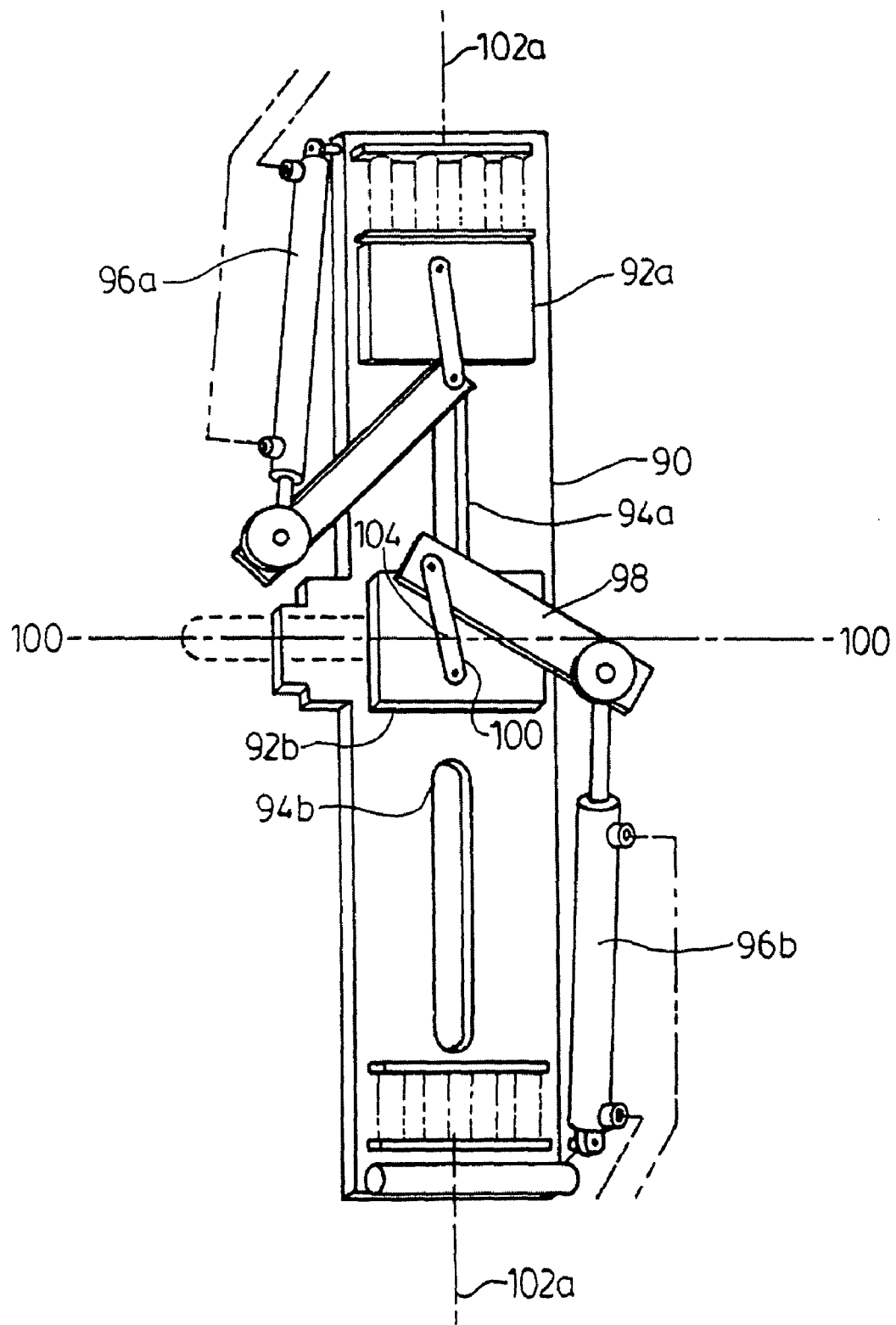
FIG. 12 is an elevation of a rotor and sliders according to a third embodiment of the invention.

FIG. 12 described below shows the desirable location of terminal component 30 (numbered 92b in FIG. 12). In the embodiment illustrated in FIG. 12, the two terminal components are not connected but the operation of the rotor is similar to that illustrated in FIG. 5.

Figure 6:
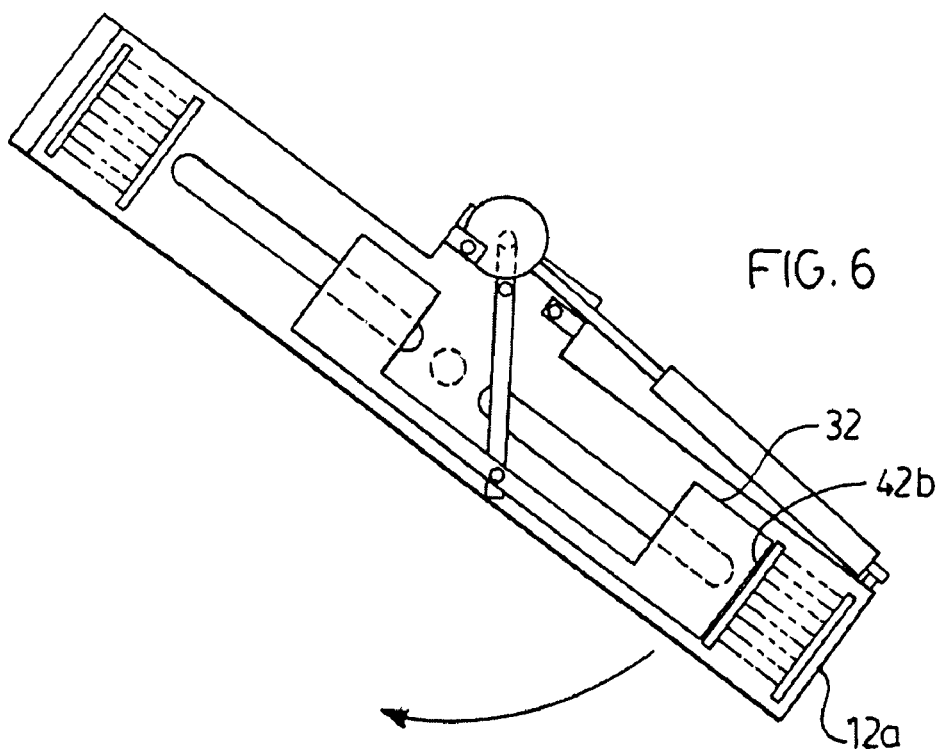

In FIG. 6, end 12a which was previously the upper end of the rotor has now become the lower end. As the end approaches its lowest point in a revolution, terminal plate 32 continues to contact stop point 42b.

Figure 7:
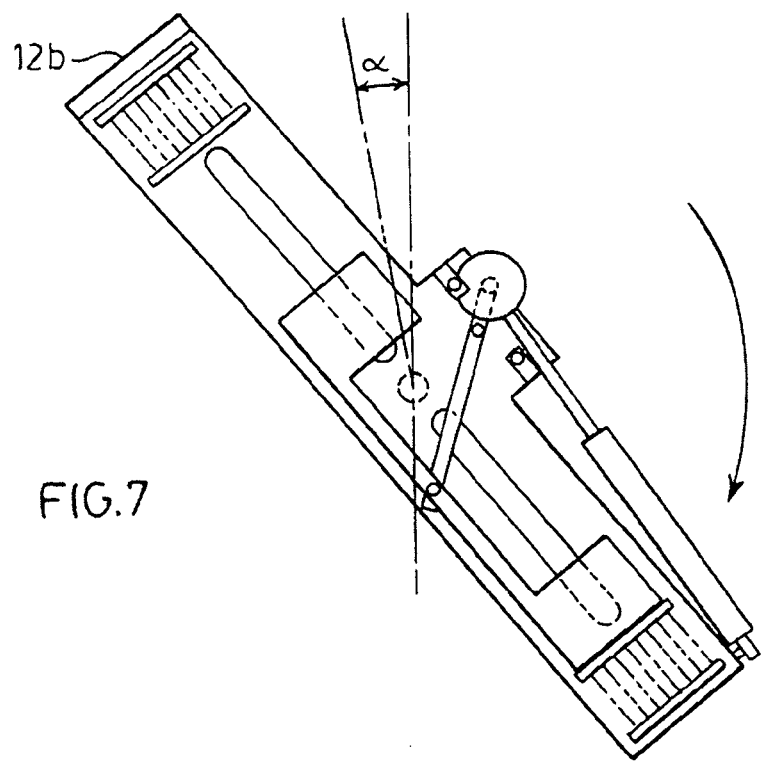
Figure 8:
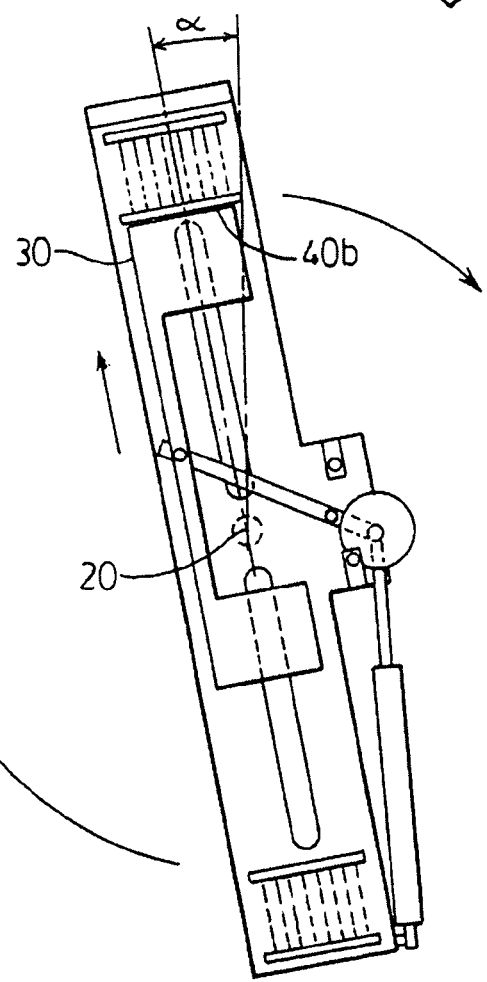

In FIG. 7, end 12b of the rotor approaches its highest point and the ram of the actuator begins to retract thereby causing the slider to move upward. In FIG. 8, the ram is fully retracted and terminal plate 30 contacts the stop point defined by inner end plate 40b. The momentum of the rotor carries it past the point at which its upper end 12b is vertically above the axis of rotation 20-20. Once past that point, the moment produced by terminal plate 30 will cause the rate of rotation of the rotor to again accelerate.

With reference again to FIG. 1, the speed accelerating apparatus 22 is composed by a driving pulley 60 which is attached by a spline to spindle 18 for rotation. A belt interconnects pulley 60 to first and second conventional arrays of belts and pulleys of unequal diameter, generally 62, 64 for increasing the rate of rotation of the output from the spindle. The output from the second array is connected by belt 66 to turbine 24. The turbine is of conventional construction and functions to generate electrical energy.

Figure 9:
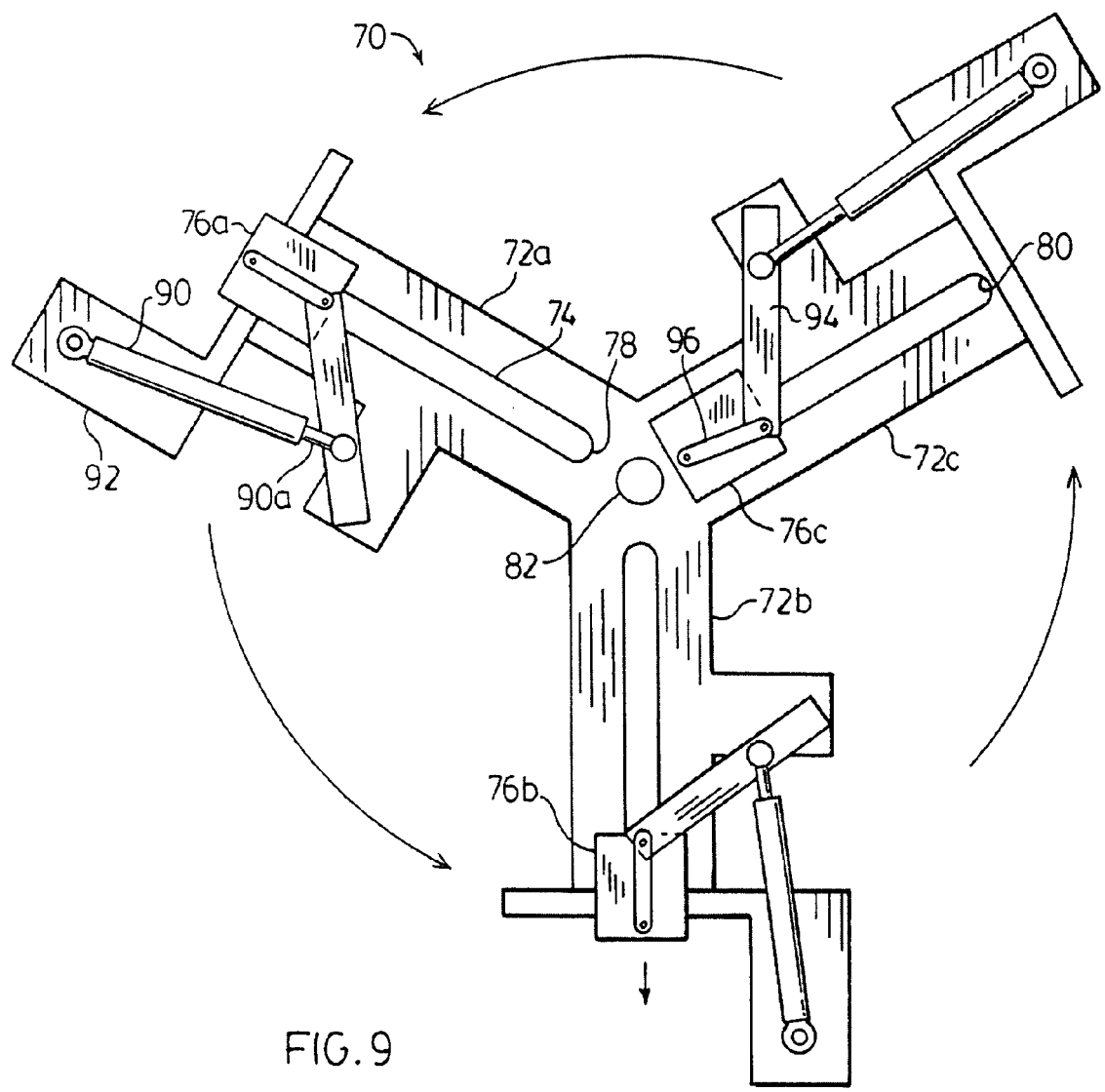
FIG. 9 is a simplified elevation of a rotor and sliders according to a second embodiment of the apparatus of the invention.

With reference to FIG. 9, the rotor generally 70 is trihedral having three arms 72a,b and c. The angle between each arm and the adjacent arm on either side of it is 120 degrees. The arms have an elongated grooves 74 for receipt of sliders 76a,b and c. The sliders are movable between inward and outward stop points 78, 80 respectively. The stop points are defined by the inner and outer ends of the groove. It will be observed that the inner stop point is adjacent to the axis of rotation 82 of the rotor while the outer stop point is adjacent to the outer wall of the arm.

An actuator 90 is pivotally connected to an L-shaped support 92 attached to the outer wall of each arm. The ram or piston rod 90a of the actuator is pivotally connected to a first link 94 which in turn is pivotally connected to a second link 96, the latter link being pivotally connected to the slider.

Sliders 76 operate in a way similar to slider 14 of the previous drawings. As the rotor revolves, each slider is drawn radially outward by the actuator to which it is attached as the arm reaches it uppermost position on the rotor. The actuator draws the slider radially inward when the slider reaches the lowermost position on the rotor.

Figure 10:
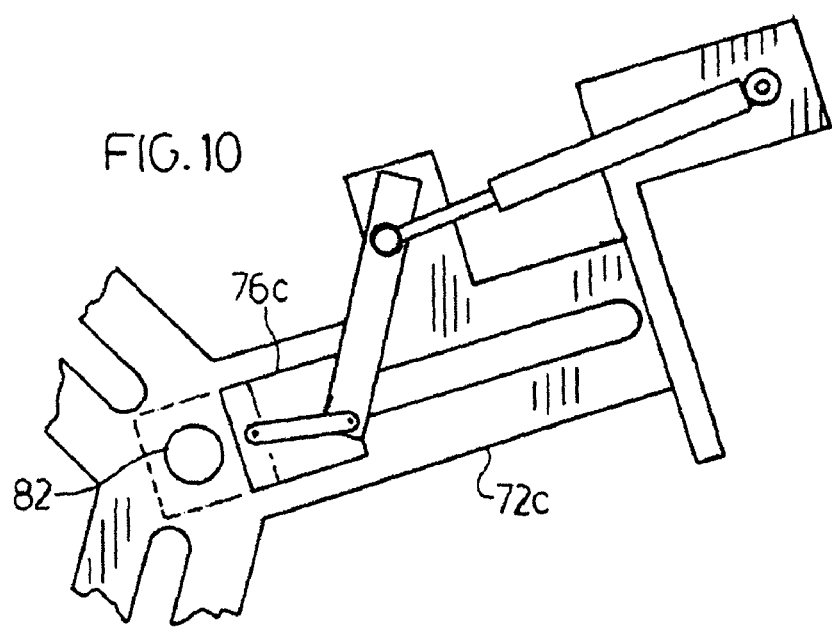
FIG. 10 is an elevation of a portion of the rotor and slider illustrated in FIG. 9.

With reference to FIG. 10, the innermost position of slider 76c as arm 72c rotates about the axis of rotation 82 of the rotor is illustrated in broken lines. In that position, the slider is at the same elevation as the axis of rotation.

As the rotor completes each revolution, each slider will slide into and out of the innermost position once. Depending on the shape of the sliders, they may collide with and foul each other as they move into and out of this position. To avoid this, the walls of the grooves are constructed such that the slider in each groove travels in a path that traces out an imaginary disc but the discs of the three sliders are horizontally spaced apart from each other. FIG. 11 illustrates the paths that the three sliders follow.

Figure 11A:
FIG. 11 is a simplified elevation of each slider illustrated in FIG. 9 in conjunction with the central portion of the rotor.
Figure 11B:
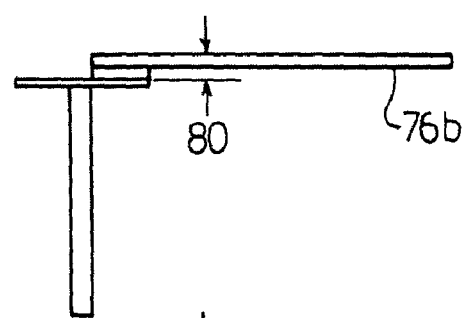
Figure 11C:
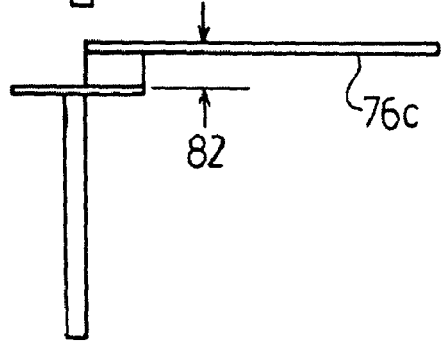

In FIG. 11a, slider 76a is adjacent to the centre of rotor 12 as it revolves around axis 82. In FIG. 11b, slider 76b is spaced apart from the rotor by a space 80 which is slightly greater than the thickness of slider 76a and in FIG. 11c, slider 76c is spaced apart from the rotor by a space 82 which is slightly greater than the thickness of sliders 76a and 76b. The sliders being spaced apart in this manner will not contact each other as they move into and out of the innermost position on the rotor.

With reference to FIG. 12 rotor 90 is similar to rotor 12 of FIG. 1. The slider is however different. Rotor 90 is provided with two sliders 92a,b which are not connected to each other. Each slider is of the same weight as the other and each travels on rollers in a separate groove 94a,b. The rollers and grooves are of the same construction as rollers 36 and grooves 38 in FIG. 1. A separate actuator 96a,b activates each slider. Pivotally interconnected links 98, 100 interconnect the ram of each actuator and a separate slider. The operation of the rotor and sliders of FIG. 12 is similar to the rotor and slider of FIG. 1.

In FIG. 12, slider 92a is located at its outer stop point while slider 92a is at the inner stop point. Preferably the weight of slider 92a is evenly distributed on opposite sides of an imaginary line 100 which lies normal to the longitudinal axis 102a-102a of the rotor and which intersects the axis of rotation 104 of the rotor.

Figure 13:
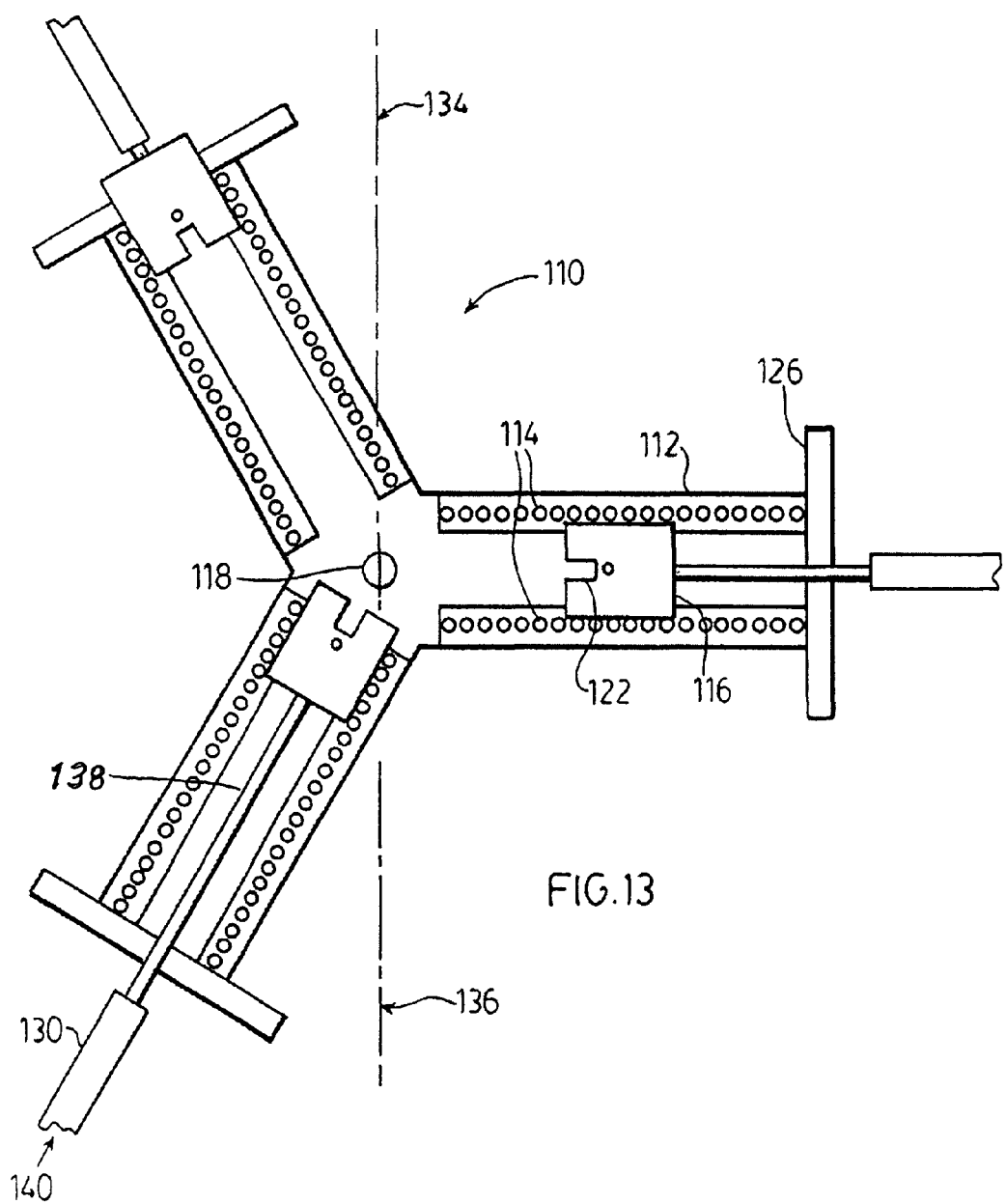
FIG. 13 is a simplified elevation of a rotor and sliders according to a third embodiment of the apparatus of the invention.

With reference to FIG. 13, the rotor, generally 110, has a trihedral shape like the rotor of FIG. 9. On each arm 112 of the rotor are two parallel lines of rollers 114 which define the path along which slider 116 travels. The path radiates outwardly from spindle 118 about which the rotor revolves and is oriented approximately 120 degrees apart from the paths of the other two sliders. Each slider is movable between radially inner and radially outer stop points at opposite ends of its travel. The slider is at its inner stop point when the end wall of slot 22 formed in the slider contacts spindle 118. The slider is at its outer stop point when the slider contacts end plate of arm 112.

An actuator 130 at the outer end of each arm causes the slider to move radially inward and outward in its respective path. The radial movement is controlled such that as each slider rotates toward an upper point 134 at which the slider is vertically above the spindle, the slider travels radially outwardly in its path. Conversely as each slider rotates toward a lower point 136 at which the slider is below the axis, the slider travels radially inward in its path.

Each actuator has a ram or piston rod 138 which is connected to a separate slider for imparting radial movement to the slider. The piston rod extends and retracts in a direction 140-140 which is collinear with the direction of radial movement of the slider. The direction of movement of the piston rod in this Figure is to be contrasted with the direction of movement of the piston rods in FIG. 9. In the latter Figure, the piston rods extends and retracts in a direction which is spaced apart from the direction of radial movement of the sliders.

It will be understood, of course, that modifications can be made in the structure of the apparatus described above without departing from the scope and purview of the invention as defined in the appended claims.

I claim:

1. Apparatus for converting the energy of fluid under pressure to electrical energy including: a spindle rotatable about a horizontal axis; a slider rotatable with said spindle and adapted to rotate about said horizontal axis and movable between two stop points on opposite sides of said horizontal axis, an actuator activated by a fluid under pressure for causing said slider to move back and forth between said stop points and for controlling said back and forth movement such as to cause said slider to rotate; and means for harnessing the rotational energy of said spindle for the production of electricity, further including a rotor associated with said slider and rotatable about said horizontal axis; said rotor being provided with a pair of end plates each of which constituting a separate said stop point; and resilient means for biasing said end plates toward said slider.

2. The apparatus of claim 1 wherein said rotor being provided with said stop points.

3. Apparatus for converting the energy of fluid under pressure to electrical energy including: a rotor mounted to a spindle having an axis of rotation oriented horizontally, a slider associated with said rotor and being movable between two stop points above and below said axis of rotation, said slider having a pair of spaced apart terminal plates being of equal weight; an actuator for causing said slider to move back and forth between said stop points; one said terminal plate, when vertically above the other said terminal plate, being at one said stop point while the other said terminal plate being spaced apart from the other said stop point with resulting rotation of said slider and said spindle; and means for harnessing the rotational energy of said spindle for the production of electricity.

4. The apparatus of claim 3 wherein said terminal plates are spaced apart such that when one said terminal plate is at one said stop point, said axis of rotation extends through the other said terminal plate.

5. The apparatus of claim 3 wherein said rotor has a longitudinal axis which is parallel to the direction of movement of said slider between said two stop points, said terminal plate being spaced apart such that when one said terminal plate is at one said stop point, said axis of rotation extends through the other said terminal plate, said axis intersecting an imaginary line which extends normal to said longitudinal axis and which divides said other terminal plate into two segments of equal weight.

6. Apparatus for converting the energy of fluid under pressure to electrical energy including: a spindle rotatable about a horizontal axis; a pair of sliders rotatable with said spindle about said horizontal axis, said sliders each being movable between a separate one of a pair of stop points, each said pair being on opposite sides of said horizontal axis, a pair of actuators activated by fluid under pressure, each said actuator causing a separate said slider to move back and forth in its respective said pair of stop points and for controlling said back and forth movement such that as one said slider rotates to a point at which said one slider is vertically above the other said slider, said actuator causes said one slider to move upward into contact with an upper stop point of its respective said pair of stop points with resulting harnessing of gravity to cause said one slider to continue to rotate; and means for harnessing the rotational energy of said spindle for the production of electricity, further including a rotor associated with said slider and rotatable about said horizontal axis; said rotor being provided with a pair of end plates each of which constituting a separate said stop point in a separate said pair of stop points; and resilient means for biasing said end plates toward said slider.

7. The apparatus of claim 6 wherein said rotor being provided with said stop points.

8. Apparatus for converting the energy of fluid under pressure to electrical energy including: a spindle rotatable about a horizontal axis; three sliders rotatable with said spindle about said horizontal axis and traveling in paths which radiate outwardly from said horizontal axis, said paths being oriented approximately 120 degrees apart from each other, said sliders being movable between radially inner and radially outer stop points at opposite ends of said paths, three actuators activated by fluid under pressure, each said actuator causing a separate said slider to move radially inward and outward in its respective said path and for controlling said radial movement such that as each one said slider rotates toward an upper point at which each said slider is vertically above said horizontal axis, said each one slider travels radially outwardly in its respective said path and as said each one slider rotates toward a lower point at which said each one slider is vertically below said horizontal axis, said each one slider travels radially inward in its respective said path; and means for harnessing the rotational energy of said spindle for the production of electricity.

9. The apparatus of claim 8 wherein each said actuator has a piston rod which is operatively connected to a separate said slider for imparting radial movement to said separate slider, said piston rod extending and retracting in a direction which is spaced apart from the direction of radial movement of said separate slider.

10. The apparatus of claim 8 wherein each said actuator has a piston rod which is operatively connected to a separate said slider for imparting radial movement to said separate slider, said piston rod extending and retracting in a direction which is collinear with the direction of radial movement of said separate slider.

11. Apparatus for converting the energy of fluid under pressure to electrical energy including: a spindle rotatable about a horizontal axis; a pair of sliders rotatable with said spindle about said horizontal axis, said sliders each being movable between a separate one of a pair of stop points, each said pair being on opposite sides of said horizontal axis, a pair of actuators activated by fluid under pressure, each said actuator causing a separate said slider to move back and forth in its respective said pair of stop points for controlling said back and forth movement such that as one said slider rotates to a point at which said one slider is vertically above the other said slider, said actuator causes said one slider to move upward into contact with an upper stop point of its respective said pair of stop points with resulting harnessing of gravity to cause said one slider to continue to rotate; and means for harnessing the rotational energy of said spindle for the production of electricity, wherein said terminal plates are spaced apart such that when one said terminal plate is at one said stop point, said axis of rotation extends through the other said terminal plate.

12. Apparatus for converting the energy of fluid under pressure to electrical energy including: a spindle rotatable about a horizontal axis; a pair of sliders rotatable with said spindle about said horizontal axis, said sliders each being movable between a separate one of a pair of stop points, each said pair being on opposite sides of said horizontal axis, a pair of actuators activated by fluid under pressure, each said actuator causing a separate said slider to move back and forth in its respective said pair of stop points and for controlling said back and forth movement such that as one said slider rotates to a point at which said one slider is vertically above the other said slider, one said actuator causes said one slider to move upward into contact with an upper stop point of its respective said pair of stop points with resulting harnessing of gravity to cause said one slider to continue to rotate; and means for harnessing the rotational energy of said spindle for the production of electricity, wherein said rotor has a longitudinal axis which is parallel to the direction of movement of said sliders between said two stop points; said terminal plates being spaced apart such that when one said terminal plate is at one said stop point, said axis of rotation extends through the other said terminal plate, said axis intersecting an imaginary line which extends normal to said longitudinal axis and which divides said other terminal plate into two segments of equal weight.

* * * * *